US009417815B1

(12) United States Patent
Elisha

(10) Patent No.: US 9,417,815 B1
(45) Date of Patent: Aug. 16, 2016

(54) CAPTURING SNAPSHOTS OF STORAGE VOLUMES

(71) Applicant: Amazon Technologies, Inc., Reno, NV (US)

(72) Inventor: Simon Jeremy Elisha, Melbourne (AU)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 13/924,335

(22) Filed: Jun. 21, 2013

(51) Int. Cl.
*G06F 12/12* (2016.01)
*G06F 3/06* (2006.01)
*G06F 11/14* (2006.01)
*G06F 11/20* (2006.01)

(52) U.S. Cl.
CPC .......... *G06F 3/0655* (2013.01); *G06F 11/1456* (2013.01); *G06F 11/2074* (2013.01)

(58) Field of Classification Search
CPC ............ G06F 11/1456; G06F 11/2074; G06F 11/2071; G06F 11/1451; G06F 11/2082; G06F 11/2064
See application file for complete search history.

(56) References Cited

U.S. PATENT DOCUMENTS

| | | | |
|---|---|---|---|
| 6,973,549 B1 * | 12/2005 | Testardi | G06F 9/526 707/E17.005 |
| 7,013,379 B1 * | 3/2006 | Testardi | G06F 3/0613 711/206 |
| 7,069,307 B1 * | 6/2006 | Lee | G06F 3/0605 709/203 |
| 7,620,765 B1 * | 11/2009 | Ohr | G06F 11/1448 711/162 |
| 7,761,456 B1 * | 7/2010 | Cram | G06F 11/1435 707/754 |
| 7,827,145 B1 * | 11/2010 | Spertus | G06F 11/1464 707/610 |
| 8,688,935 B1 * | 4/2014 | Yochai | G06F 3/0608 707/639 |
| 8,954,383 B1 * | 2/2015 | Vempati | G06F 17/30088 707/610 |
| 8,990,164 B1 * | 3/2015 | Mahajan | G06F 11/1451 707/649 |
| 9,021,222 B1 * | 4/2015 | Sadhu | G06F 11/1446 711/144 |
| 2002/0002661 A1 * | 1/2002 | Blumenau | G06F 3/061 711/165 |
| 2002/0019920 A1 * | 2/2002 | Reuter | G06F 3/0605 711/203 |
| 2002/0107877 A1 * | 8/2002 | Whiting | G06F 11/1453 707/610 |
| 2005/0021715 A1 * | 1/2005 | Dugatkin | H04L 43/12 709/223 711/162 |
| 2012/0123999 A1 * | 5/2012 | Ashutosh | G06F 11/1453 707/618 |
| 2012/0210041 A1 * | 8/2012 | Flynn | G06F 1/183 711/3 |

(Continued)

*Primary Examiner* — Jared Rutz
*Assistant Examiner* — Jean Edouard
(74) *Attorney, Agent, or Firm* — Davis Wright Tremaine LLP

(57) ABSTRACT

A method and apparatus for capturing a snapshot of storage volumes of a data capture group are disclosed. In the method and apparatus, a request to create a data capture group may be received and processed. The data capture group may have one or more storage volumes. Upon defining the data capture group, a snapshot of the storage volumes of the data capture group may be taken.

24 Claims, 9 Drawing Sheets

(56) References Cited

U.S. PATENT DOCUMENTS

| | | | |
|---|---|---|---|
| 2005/0086241 A1* | 4/2005 | Ram | G06F 17/30088 |
| 2005/0246509 A1* | 11/2005 | Topham | G06F 11/1446 711/162 |
| 2006/0155712 A1* | 7/2006 | Prahlad | G06F 3/0607 |
| 2007/0016754 A1* | 1/2007 | Testardi | G06F 3/0611 711/206 |
| 2007/0208780 A1* | 9/2007 | Anglin | G06F 11/1469 |
| 2007/0239950 A1* | 10/2007 | Kern | G06F 11/1456 711/162 |
| 2008/0034176 A1* | 2/2008 | Akutsu | G06F 11/2058 711/162 |
| 2008/0183988 A1* | 7/2008 | Qi | G06F 11/2066 711/162 |
| 2009/0037680 A1* | 2/2009 | Colbert | G06F 3/0617 711/162 |
| 2010/0036851 A1* | 2/2010 | Paterson-Jones | G06F 17/30067 707/636 |
| 2010/0036931 A1* | 2/2010 | Certain | G06F 11/1451 709/214 |
| 2010/0037031 A1* | 2/2010 | DeSantis | G06F 11/1464 711/162 |
| 2010/0070726 A1* | 3/2010 | Ngo | G06F 11/1464 711/162 |
| 2010/0228919 A1* | 9/2010 | Stabrawa | G06F 11/1456 711/120 |
| 2010/0318757 A1* | 12/2010 | Beeken | G06F 11/1456 711/162 |
| 2011/0276539 A1* | 11/2011 | Thiam | G06F 11/1448 707/634 |
| 2012/0079221 A1* | 3/2012 | Sivasubramanian | G06F 11/1456 711/162 |
| 2012/0079224 A1* | 3/2012 | Clayton | G06F 11/1456 711/162 |
| 2012/0221774 A1* | 8/2012 | Atkisson | G06F 12/0802 711/103 |
| 2013/0080695 A1* | 3/2013 | Beeken | G06F 3/065 711/112 |
| 2013/0346713 A1* | 12/2013 | Beeken | G06F 3/065 711/162 |

* cited by examiner

CAPTURING SNAPSHOTS OF STORAGE VOLUMES

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. The content providers and online merchants, who traditionally used on-site servers and storage equipment to host their websites and store and stream content to their customers, often forego on-site hosting and storage and turned to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as need and depending on their needs.

Further, it is often important for the clients of a computing resource provider to be able to capture their data that is stored in a large-scale network and used by a variety of servers and hosts. For example, an organization may retain data for the purpose of being able to revert a system to a previous state. In addition, modern computer systems often utilize multiple storage volumes. Different volumes may be used for different types of data and/or to provide redundancy.

BRIEF DESCRIPTION OF THE DRAWINGS

Various embodiments in accordance with the present disclosure will be described with reference to the drawings, in which.

DETAILED DESCRIPTION

Figure 1:
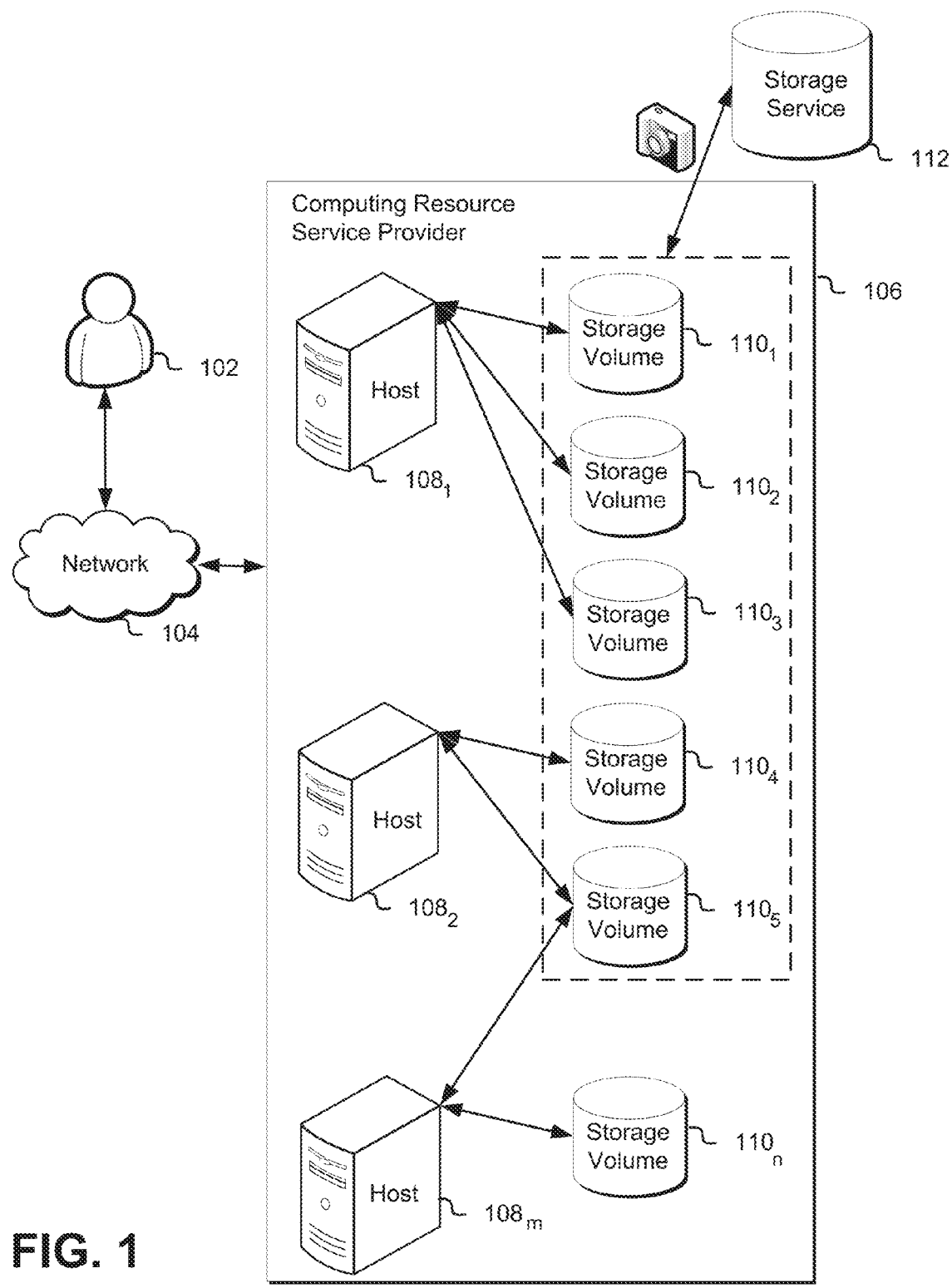
FIG. 1 shows an example of capturing a snapshot of stored data.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to creating a data capture group having one or more storage volumes and capturing the one or more storage volumes of the data capture group. In an embodiment, a user may receive a request from a user to create a data capture group. The request may include descriptive information associated with the data capture group. A management service receives the request to create a data capture group and causes a command for creating an entry for the data capture group to be issued. In some embodiments and after creating the data capture group, the management service may receive a request to capture a snapshot of the storage volumes of the data capture group, where a snapshot or a capture of the data capture group is a representation of a data set stored by the volume(s) in the data capture group at a moment in time. Upon receiving the request to capture a snapshot of the storage volumes, the management service may cause a command for capturing the data of the storage volumes to be issued. Upon issuing the command for capturing the data of the storage volumes, the data of the storage volumes may be captured and stored in a destination storage service. In one embodiment, the snapshot data of the storage volumes of the data capture group may be stored as one or more homogeneous bodies or as one or more data objects in a storage service. The location of where the one or more homogeneous bodies or one or more data objects are stored may be indicated in the descriptive information or in the request for capturing the data capture group. In another embodiment, the snapshot of each storage volume of the data capture group may be stored in a uniquely addressable location of the storage service.

The descriptive information of the data capture group may include an identity associated with a storage volume of the data capture group, an identity associated with a host of the storage volume or an identity associated with a load balancer, where the association between the load balancer and one or more storage volumes of a data capture group may be indirect, though the hosts referenced by the load balancer. The descriptive information may also an indication of whether a unified snapshot or a transient snapshot is sought or an indication of whether a reference snapshot or a delta snapshot is sought. The descriptive information may also include an identity of a destination storage service in which the captured data may be stored, a retention period the duration of which the snapshot data is to be retained in the storage service or a restoration location to which the snapshot data is to be stored when requested.

In another embodiment, the management service may receive a request modify the data capture group. The request to modify the data capture group may originate from a user. The request to modify the data capture group may be directed to the addition or removal of storage volumes from the data capture group. The request to modify the data capture group may also be directed to modifying the descriptive information associated with the data capture group including the retention time, the destination storage service and the like.

In an embodiment, the management service may determine the identity of one or more storage volumes of the data capture group based on the descriptive information. In other words, in some embodiments, the descriptive information may not explicitly identify the volumes in an associated data capture group, but the descriptive information is used to determine which set of volumes is in the data capture group, where the set may dynamically change over time. In some examples, the management service may identify the one or more storage volumes based on the identity or function of a host of the one or more storage volumes or the identity or function of a load balancer servicing a host of the one or more storage volumes. Generally, the descriptive information may identify a characteristic of one or more volumes that is used to determine which volume(s) is/are in the data capture group.

In another embodiment, the management service may receive a request to restore the captured data. The request may, for instance, specify the captured data to be restored by an identifier associated with a data capture group. The request to restore the captured data may also include an indication of a location to which the captured data is to be restored. In yet another embodiment, the location to which the captured data is to be restored may be specified in the descriptive information. The snapshot of the storage volumes of the data capture data may be restored as one or more homogeneous bodies or one or more data objects that individually or collectively represent the captured snapshot. Alternatively, the snapshot of each storage volume of the data capture group may be restored to an individual or independent restoration location. The location(s) to which the snapshot is restored may be specified as part of the descriptive information or in the request to restore the data capture group.

In another embodiment, the management service may receive a request to delete a captured snapshot. The request to delete the captured snapshot may include an identity associated with the captured snapshot. Upon receiving the request to delete the captured snapshot, the management service may determine whether the snapshot that is requested to be deleted serves as the basis or a reference for a delta snapshot discussed below. The management service may further cause a command for deleting the captured snapshot from a storage service to be issued. The deleted snapshot may be that which is captured of one or more volumes of the data capture group or, alternatively, the deleted snapshot may be which is captured of all the volumes of the data capture group.

In network computing and storage, network resources for data processing and data storage are available to users and subscribers for performing their computing needs. The network resources may be used for a variety of functions, such as web-related functions. For example, the network computing resources may be used as computing platforms for running hosts, such as email or web servers, whereas the network storage resources may be used for storing data used by the hosts, for example, web content used by the web server or archived emails used by the email server, or other general purpose data. Because the data processing and data storage resources are network-based, the user's computing and storage platform are decentralize and the user is provided with the flexibility to add additional processing and storage resource dynamically as needed by borrowing or renting resources from a provider of network computing and storage resources. Further, the user is provided with the flexibility to remove existing resource as the user's demand for the resources declines.

Regardless of where data storage resources are located in a network or where the data is stored, it is often important to capture a snapshot of the stored data and store the snapshot in a back-up location. Capturing the data and storing a copy of the data may be performed for back-up, redundancy, regulatory purposes and the like. The data snapshot is may be retained for a period of time, for example, a predefined period of time, or indefinitely and may be accessed at a later time as need arises.

FIG. 1 shows an example of capturing a snapshot of stored data. A user 102 is connected to a computing resource service provider 106 via a network 104. The user 102 may be a human-operated device, such as a computer, tablet, smart phone and the like, or an automated device configured to operate in accordance with the embodiments described herein. In addition, the user may be a network computer or a virtual machine. The user 102 may communicate with the network 104 using any connection type, such as a wired, wireless or fiber optic connection and the network, in turn, may communicate with the computing resource service provider 106 using connection type. Further, the user 102 may be a customer of the computing resource service provider or may be a user interacting with the computing resource service provider on behalf of a customer.

The network 104 may of any type, such as the Internet, an intranet or an Internet service provider (ISP) network. The computing resource service provider 106 comprises a plurality of hosts $108_1$, $108_2$, . . . , $108_m$ (singularly referred to hereinafter as host 108 and collectively referred to hereinafter as hosts $108_{1-m}$) and a plurality of storage volumes $110_1$, $110_2$, . . . , $110_n$ (singularly referred to hereinafter as storage volume 110 and collectively referred to hereinafter as storage volumes $110_{1-n}$). Each storage volume 110 may utilize the storage resources of one or more storage devices (not shown), such as hard disks with spinning magnetic media or solid state drives. Further, the storage devices implementing a single storage volume may comprise multiple different types of storage devices (e.g., hard disks with spinning magnetic media or solid state drives. The storage devices may be part of or connected to the same network or different networks and may have the same or different types of storage or the same or different manufacturers. A storage device may be dedicated to a particular storage volume 110 or shared among one or more storage volumes $110_{1-n}$.

As described herein, the computing resource service provider 106 enables the processing and storage of data by providing computing and storage resource to the user 102. The host 108 may be a virtual computer system that uses computational resource provided by the computing resource service provider 106. The host 108 may be associated with one or more storage volumes $110_{1-n}$ and a storage volume 110 may be associated with one or more hosts $108_{1-m}$. For example, host $108_1$ is associated with three storage volumes $110_1$, $110_2$, $110_3$ and storage volume $110_5$ is associated with two hosts $108_{2,m}$.

Further, one or more of the hosts $108_{1-m}$ and one or more of the storage volumes $110_{1-n}$ may be utilized by the user 102. In the example illustrated in FIG. 1, the user 102 utilizes two hosts $108_{1,2}$ and five storage volumes $110_{1-5}$ to utilize the services of the computing resource service provider 106. The five storage volumes $110_{1-5}$ of the user 102 may be captured and stored in a storage service 112 for back-up or any other purpose. The data of the captured storage volumes $110_{1-n}$ may be retained in the storage service 112 for a period of time or indefinitely and may be later restored to the storage volumes or to another storage space.

To enable capturing data from storage volumes $110_{1-n}$, the user 102 may define or specify the storage volumes $110_{1-n}$ to be captured and other metadata or descriptive information associated with the capturing of the storage volumes $110_{1-n}$ and may initiate the capturing of the storage volumes by issuing an application programming interface (API) function call to the computing resource service provider 106. Initiation of the capturing may also occur pursuant to an automated process, such as a process of the customer 102 or computing resource service provider 106 that issues API function calls according to one or more triggers, such as the passage of a specified amount of time, a number of write operations, an amount of new data written, among others. The computing resource service provider 106 may cause the storage volumes $110_{1-n}$ that are specified by the user 102 to be captured and to be stored in the storage service 112. The storage volumes $110_{1-n}$ may be captured regardless of whether they use the storage resources of one storage device or plurality of storage devices as described herein.

In an embodiment, the host 108 provides computational resources on which applications may run. The host 108 may use dedicated hardware, such as a central processing unit (CPU), a random access memory (RAM), buses, a memory controller and the like to enable the execution of applications. Alternatively, the host 108 may utilize a virtual computing platform, whereby applications that are executed on the virtual computing platform and decoupled from an underlying hardware using virtualization. In a virtual computing environment, hardware used for computing may be distributed over a network instead of being localized. Virtualization allows hardware components that are distributed over a network to be consolidated and used to provide computing platforms for multiple hosts $108_{1-m}$. A computing resource service provider 106 may construct a network of hardware components that are situated in multiple locations. Further, the computing resource service provider 106 may utilize a virtualization layer that allows each host 108 to run on a shared pool of computational resources. As a result of virtualization, the distributed computational resources upon which the host 108 is run appear as a unified computing system.

Each host 108 may be used to provide computational resources for a particular service or application of the user 102. For example, a first host $108_1$ may be a web server for the user 102 and may deliver web content to the user's 102 customers, whereas a second host $108_2$ may be an application host and may provide web content to customers utilizing mobile devices to access the network 104.

As described herein, a host 108 may store data in one or more storage volumes $110_{1-n}$. For example, the first host $108_1$ stores data in storage volumes $110_{1-3}$ and the second host $108_2$ stores data in storage volumes $110_{4,5}$. The storage volumes may be remote (e.g., across a network) from the hosts and communication between a host and a storage volume may utilize one or more appropriate protocols, such as an Internet Small Computer System Interface (iSCSI). Storage volumes $110_{1-n}$ may also be added or disassociated from a host 108 dynamically or as needed by the host 108 and as provisioned by the computing resource service provider 106. The storage volumes $110_{1-n}$ may utilize the storage resources of storage devices that are part of or connected to the same network or different networks.

In addition, each storage volume 110 may be associated with a volume identity (ID), which may be a logical identity or the storage volume 110 may be identified based on the host 108 that uses the storage volume 110 or the function performed by the host 108 that uses the storage volume 110. For example, storage volumes $110_{1-3}$ may be identified as being the storage volumes used by the first host $108_1$ or as being the storage volumes used by the web server when the first host $108_1$ is a web server. The flexibility in identifying the storage volumes of the user 102 allows for ease of identification of the storage volumes for which the user seeks to capture a snapshot. Identifiers may also be unique in a set of storage volumes, such as all storage volumes provided as a service and/or all storage volumes associated with the customer. Uniquely identifying the storage volumes $110_{1-n}$ independently of their physical location in a network allows for capturing data relevant to the user regardless of the host 108 that uses the storage volumes $110_{1-n}$.

In addition to providing virtual computing resources for the hosts $108_{1-m}$, the computing resource service provider 106 may also include an on-demand storage service and an archival storage service where a snapshot of the data of captured storage volumes $110_{1-n}$ may be stored as described with reference to FIG. 2.

Figure 2:
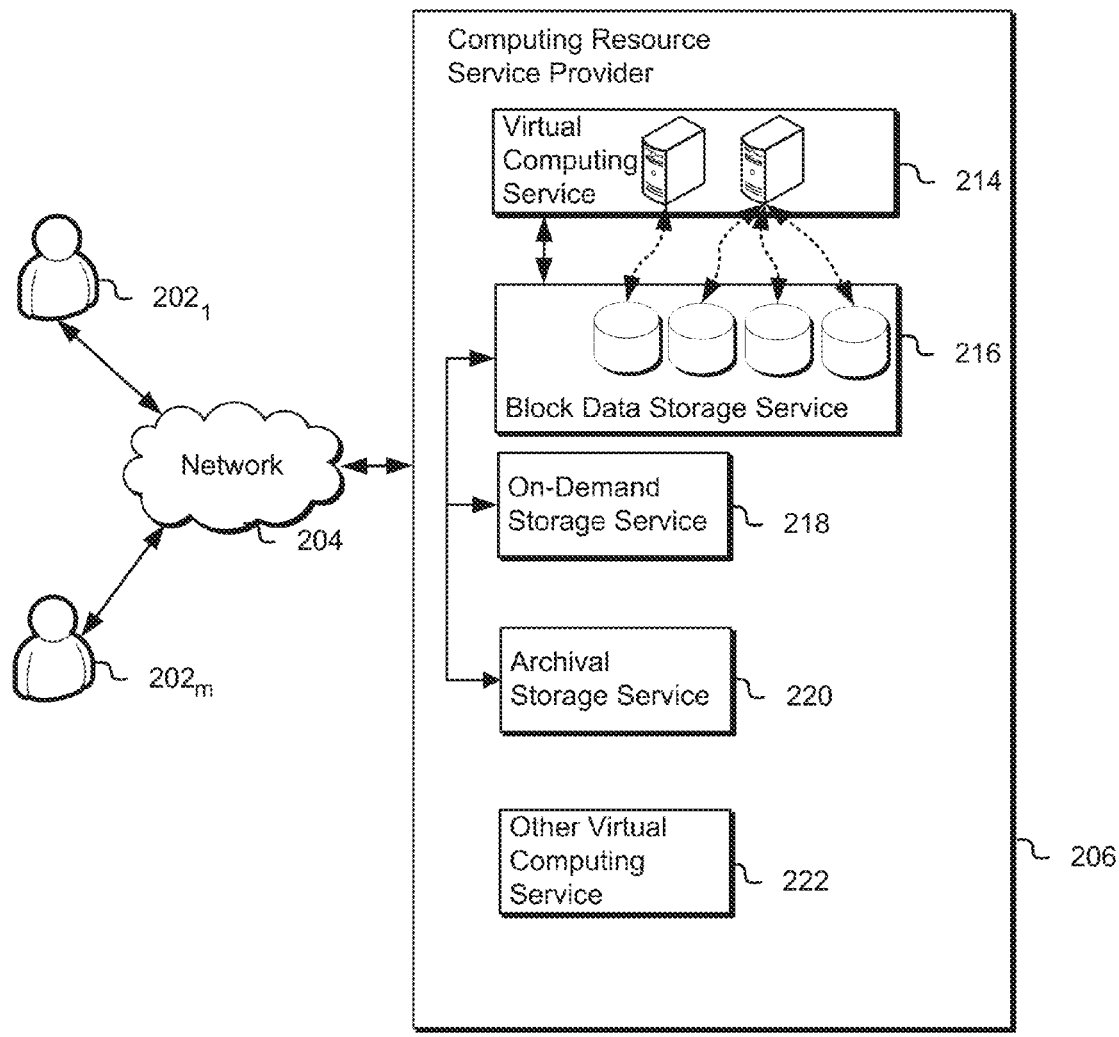
FIG. 2 shows an example of users connected to a computing resource service provider.

FIG. 2 shows an example of users connected to a computing resource service provider. The users $202_{1-p}$ are connected to the computing resource service provider 206 via a network 204. Although one network 204 is shown in FIG. 2, it is contemplated that the users $202_{1-p}$ may be connected to and may communicate with the computing resource service provider 206 using any number of networks. The computing resource service provider 206 includes a virtual computing service 214, a block data storage service 216, an on-demand storage service 218, an archival storage service 220 and other virtual computing service 222.

The virtual computing service 214 provides a virtual computing platform on which hosts, such as hosts $108_{1-m}$ described with reference to FIG. 1, may execute applications. The block data storage service 216 of the computing resource service provider 206 is a storage service that may include various storage volumes and may be distributed across multiple networks. The block data storage service 216 provides users $202_{1-p}$ and hosts $108_{1-m}$ with the capability to store data on a network.

The on demand storage service 218 and the archival storage service 220 of the computing resource service provider 206 are further types of storage services provided by the computing resource service provider 206. The on demand storage service 218 and the archival storage service 220 may be used to store snapshots of data on the block data storage service 216. The on demand storage service 218 and the archival storage service 220 may differ in access time, reliability and cost. For example, data stored in the on demand storage service 218 may be more readily available to the user 202 than the archival storage service 220 and may have a lower retrieval or access time than data stored in the archival storage service 220. However, due to the desirable features of the on demand storage service 218, the on demand storage service 218 may have a higher cost per storage unit than the archival storage service 220 or a higher cost per read or write than the archival storage service 220.

Other virtual computing service 222 may also be part of the computing resource service provider 206, which may provide additional computation resources for the users $202_{1-p}$.

In order to facilitate capturing storage volumes that are used by multiple hosts and that are disposed across one or more networks, the block data storage service 216 may include a management service that is responsible for receiving and processing requests for capturing or snapshotting storage volumes and for causing the execution of capturing snapshots of storage volumes and storing the snapshots in a storage service. Further, the block data storage service 316 may include metadata storage for storing descriptive information about the storage volumes to be captured as described with reference to FIG. 3.

Figure 3:
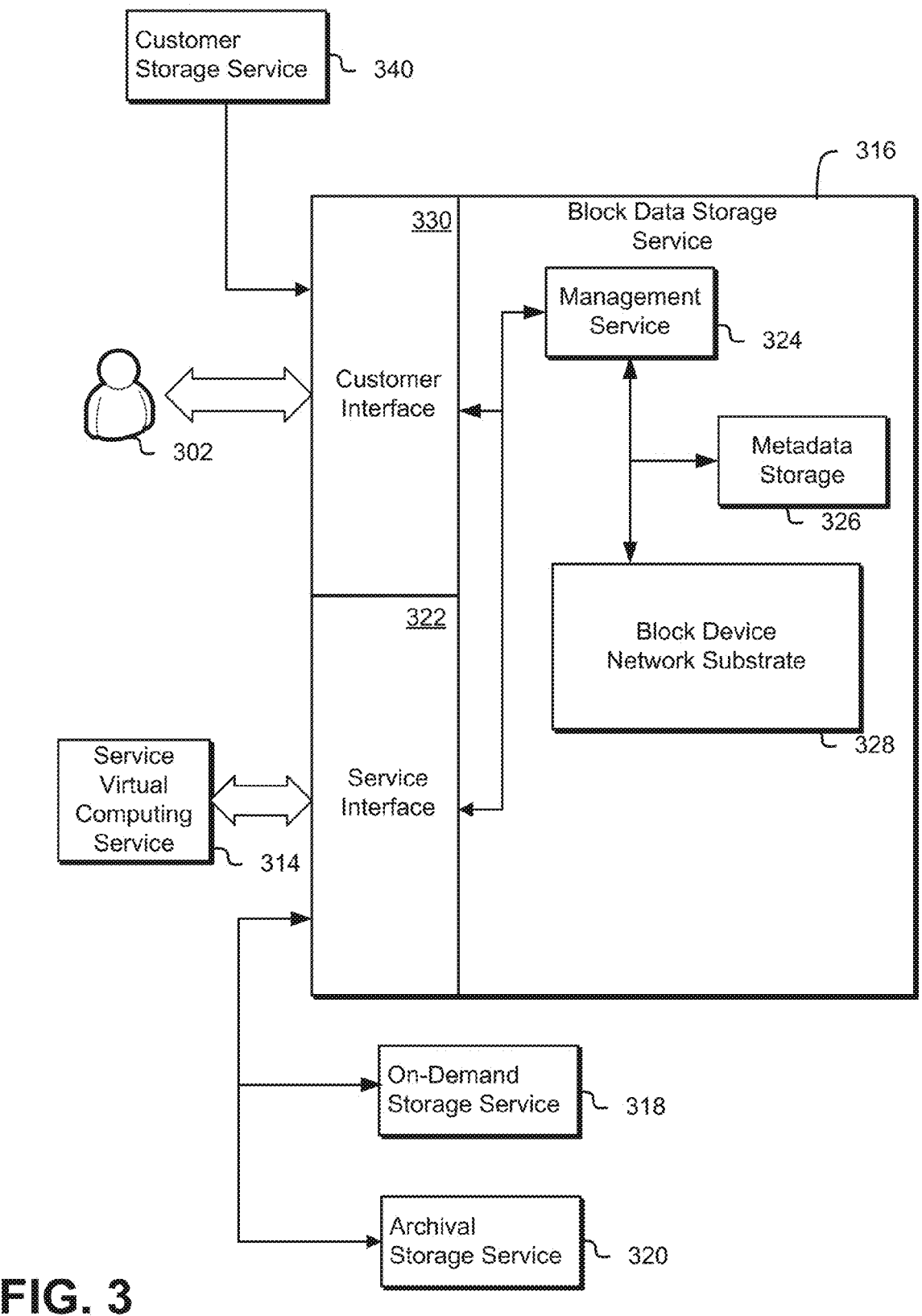
FIG. 3 shows an example of a block data storage service in a computing resource service provider environment.

FIG. 3 shows an example of a block data storage service in a computing resource service provider environment. The block data storage service 316 includes a customer interface 330 by which a user 302 interacts with the block data storage service 316. The user 302 interacts with the block data storage service 316 using a virtual machine that is run on virtual computing service 314. Alternatively, the user 302 may be a human-operated device, such as a computer, that is equipped with a portal or interface by which the user 302 may execute function calls to the block data storage service 316. The portal may be provided by the block data storage service 316 for any number of users to manage their storage volumes and enable the capturing of a snapshot of the storage volumes and the storage of the snapshot in a storage service.

The block data storage service 316 also includes a service interface 322. The service interface enables the block data storage service 316 to communicate and to be connected with the virtual computing service 314, such as the virtual computing service 214 described with reference to FIG. 2 upon which hosts may be executed. Like the user 302, the functions of the service 324 may be executed on a virtual machine.

The block data storage service 316 includes a management service 324, metadata storage 326 and a block device network substrate 328. The block device network substrate 328 is the underlying hardware of the storage volumes and the block device network substrate 328 may comprise one or more magnetic storage disks, solid state storage drives and the like. The block device network substrate 328 may be partitioned into one or more storage volumes for use by the user 302 or the user's 302 hosts.

Data that is snapshot from storage volumes of the block device network substrate 328 may be stored in an on-demand storage service 318, an archival storage service 320 or a customer storage service 340. In the example of FIG. 3, the computing resource storage service includes an on-demand storage service 318 and an archival storage service 320 and, accordingly, communication between the block data storage service 316 and the on-demand storage service 318 and the archival storage service 320 is performed via the service interface 322. The customer storage service 340 resides at the customer and may be on-premise and, accordingly, connectivity between the block data storage service 316 and the customer storage service 340 is performed via the customer interface 330.

The user 302 may have one or more hosts and one or more storage volumes that utilize the resources of the computing resource service provider. The management service 324 facilitates capturing a snapshot of storage volumes independently of the physical storage location of the storage volumes and also across one or more hosts that utilize the storage volumes. In contrast to other systems where the host is used to manage capturing a snapshot of the storage volumes and where only the storage volumes that are used by the host may be snapshot, the management service 324 enables capturing a snapshot of multiple storage volumes that are used by one or more hosts and that reside on one or more storage devices.

The user may define a data capture group for capturing a snapshot of storage volumes. The data capture group specifies one or more volumes that are relevant to the user or that the user seeks to capture. The user may send descriptive information associated with the data capture group to the management service 324 of the block data storage service 316. The descriptive information may specify the storage volumes to be captured. The storage volumes may be specified using a volume ID of the storage volumes, an identity of a host using the storage volumes to be captured, or the services performed by the host using the storage volumes (e.g., a web server or an application host). In some embodiments and as described herein, the storage volumes may also be identified by using an identity or a function associated with a load balancer that services the hosts of the storage volumes.

The descriptive information may also specify the destination storage service in which the captured or snapshot storage volumes are to be stored, for example, the on-demand storage service 318, the archival storage service 320 or an on-premise customer storage service 340. The descriptive information may also include the duration or length of time the data is to remain in the destination storage service. After the expiration of the duration or length of time the data is to remain in the destination storage service, the data will be erased from storage service.

In addition, the descriptive information may also include an identity or an address associated of which the snapshot data is to be restored when requested. In some embodiments, the descriptive information may include a periodicity of snapshot capturing or a rate of snapshot capturing. The rate of snapshot capturing may define the number of snapshots per period of time the user seeks to be captured, for example, one snapshot per day or two snapshots per hour. The periodicity specifies a period of time the maximum of which should not expire before snapshot capturing, for example, thirty minutes. If the descriptive information does not include a periodicity or rate then a snapshot of the data may be captured upon request.

The descriptive information may also include an indication as to whether the desired snapshot is a "delta" snapshot or a reference snapshot. A delta snapshot requires a reference snapshot in order for the delta snapshot to be constructed. The delta snapshot represents a difference in data between the snapshot and another data set, for example, a previously captured reference snapshot or both a previously captured delta snapshot and a reference snapshot. A reference snapshot may be a complete set of captured data and does not requires other captured data in order to be recovered. A reference and delta snapshot are analogous to a Moving Picture Experts Group (MPEG) encoded I-frame and P-frame, respectively.

The descriptive information may also include an indication of whether a unified snapshot or a transient is sought. A unified snapshot is a snapshot that is initiated while a storage volume is in a non-transient state, which may be while input and output operations are ceased to the storage volume. When input and output operations to the storage volumes are ceased, input and output operations are also ceased to the storage devices whose resource are used by the storage volumes. A transient snapshot, however, may be initiated while data is read from or written to the storage volume. As recognized by those skilled in the art, upon retrieval, a transient snapshot may require processing before being used. For example, before usage the transient snapshot may be verified to ensure data consistency or requisite checks may be performed on the transient snapshot to ensure that the data may be used.

The user 302 may send a request to create or define a data capture group to the management service 324. The request includes the descriptive information indicating the storage volumes to be captured. The management service 324 receives and processes the request to define the data capture group and stores the descriptive information associated by the request in the metadata storage 326. The management service may create an identity or a name for the data capture group and may use the name to associate the descriptive information with the data capture group defined by the user 302. In an embodiment, the user 302 defines the identity or name of the data capture group and sends the identity or name to the management service 324. The name may be sent together with or as part of the request to create or define the data capture group, (e.g., using the API function call used to create or define the data capture group), or in a separate message or API function call. The management service 326 may use the name provided by the user to associate the descriptive information of the data capture group in the metadata storage 326.

After creating of the data capture group, the management service 326 may receive requests for capturing storage volumes of the data capture group. The management service 326 uses the descriptive information held in the metadata storage 326 for identifying the storage volumes to be snapshot and for managing the storage of the snapshot in a storage service and the potential retrieval of the snapshot from the storage service and placement of the retrieved snapshot.

The metadata storage 326 of the block data storage service 316 is advantageous in that it holds descriptive information associated with data capture groups regardless of the location in a network of the storage volumes defined by the descriptive information or the hosts using the storage volumes. The usage of the management service 324 and the metadata storage 326 is in contrast to other systems, where due to the absence of these entities, the creation data capture groups and the capturing and storage of storage volumes defined by the data capture groups is not feasible.

Upon receiving a request to capture the storage volumes, the management service 324 causes the storage volumes to be captured, for example, by calling an API function or sending a message to the one or more hosts associated with the storage volumes requesting that a snapshot of the storage volumes be captured. Further, the management service 324 may send a message or cause a function call to be sent to the block device storage substrate 328 requesting that a snapshot of the storage volumes be captured and to the management service 324 or a storage service.

As described herein, the management service 324 may identify the storage volumes to be captured using the request or the descriptive information held in the metadata storage 326. Before causing the data of the storage volumes to be captured, the management service 326 may prepare the storage volumes for snapshotting by ceasing input and output operations or read and write operations to the storage volumes. To cease read and write operations to the storage volumes, the management service 326 may instruct the hosts using the storage volumes to suspend the operations. However, as described herein, instead of capturing the storage volumes in a steady state, ceasing the read and write operations may be forgone and a snapshot of one or more storage volumes in a transient state may be captured.

Figure 4:
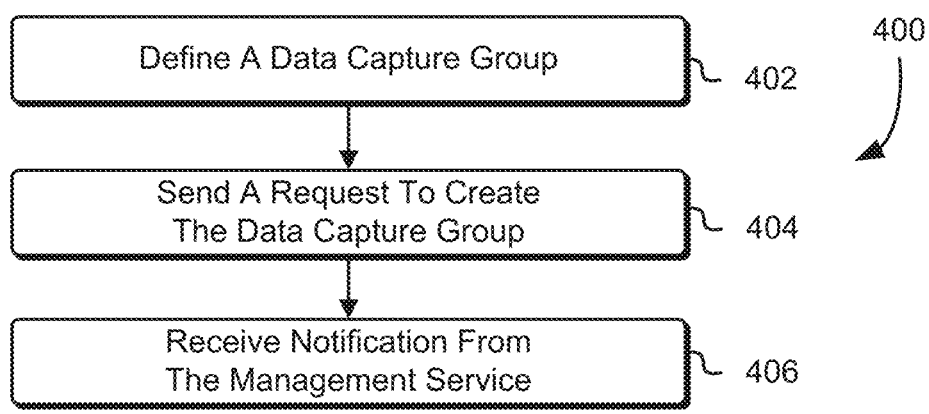
FIG. 4 shows a flow diagram of an example method for defining a data capture group.

FIG. 4 shows a flow diagram of an example method for defining a data capture group. In the method 400, a user defines a data capture group 402. As described herein, defining the data capture group includes setting forth descriptive information associated with the data capture group. The descriptive information may include the volume IDs of the storage volumes to captured, the destination storage device in which the captured data of the storage volumes is to be stored, a duration of time the length of which the data is to be stored in storage volumes and a name associated with the data capture group, among others. The user may be a human operated computer that is equipped with a portal that allows the user to enter the descriptive information associated with the data capture group. The user 302 then sends a request to define the data capture group to the block data storage service 316 404. For example, the human operator of a computer may command the portal to create the defined data capture group and the portal, in turn, may cause an API function to be called to the block data storage service 316, which is routed to the management service 324. Upon receiving the request to define the data capture group, the management service 324 may process the request to define the data capture group. In addition to defining the data capture group, the request to define the data capture group may also indicate a request to capture data.

Upon receiving the request to create the data capture group, the management service 324 identifies the purpose of the request and retrieves the descriptive information from the request. The management service 324 instructs the metadata storage 326 to create an entry for the data capture group. The entry may include a portion of or all of the descriptive information as formatted or processed by the management service 324. The entry for the data capture group may also include additional information other than that which is included in the descriptive information.

After the request is received and processed, the management service sends a notification to the user 302 indicating that the data capture group has been defined. The notification may be routed by the block data storage service 316 to the user via the customer interface. The user 302 then receives the notification indicating the data capture group has been defined 406. The user may receive the notification as a message or alert on the portal used to send the request to create the data capture group. In an embodiment, where the descriptive information did not include a name associated with the data capture group, the notification may also include an identity or a name for the data capture group.

In another embodiment, the descriptive information provided by the user for defining the data capture group may include identifying information for a storage volume other than a volume ID. For example, storage volumes may be defined by the name or functionality of their associated host, for example, the user's web server, application server or both. Instead of including in the descriptive information the volume IDs of the storage volumes associated with either server, the descriptive information may instead specify the host utilizing the storage volumes. Accordingly, the descriptive information may specify the storage volumes as the volumes of the application server or the volumes of the web server.

To identify the storage volume IDs, the management service 324 may query the service 314. The management service 324 may provide the service 314 with the identity of the host associated with the storage volumes and may receive, in return, the volume ID of the storage volumes. Further, in the event that the descriptive information identified the host by the functionality the host provides to the user 302, the management service 324 may query the service 314 to identify the volumes IDs associated with the host that provide the particular function to the user 302. For example, the management service 324 may request the identification of the storage volumes used by the email server or the application server of the user 302. Similarly, the management service 324 may query the service to identify the volume ID used by the hosts of a particular load balancer. Alternatively, based on the descriptive information, the management service 324 may query the block device network substrate 328, a host or the user 302 in order to identify the storage volumes that are requested to be captured.

Figure 5:
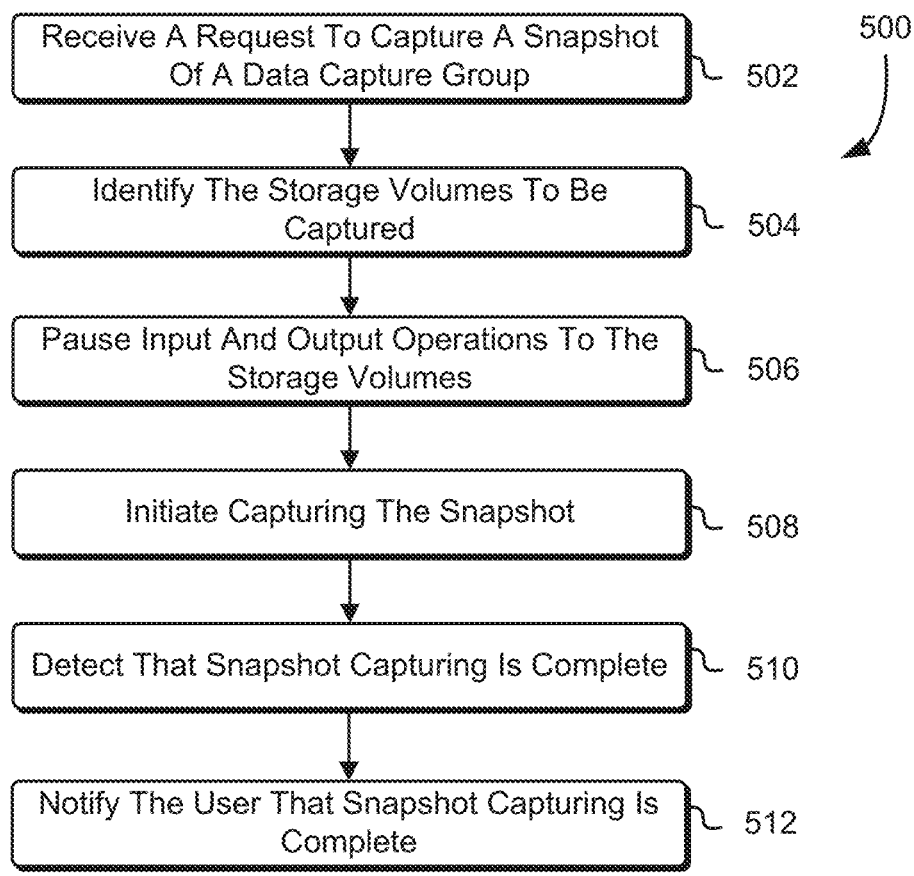
FIG. 5 shows a flow diagram of an example method for capturing a unified snapshot of a data capture group.

Upon defining the data capture group, the data of the storage volumes may be captured as described with reference to FIG. 5. FIG. 5 shows a flow diagram of an example method for capturing a unified snapshot of a data capture group. In the example method for capturing a unified snapshot of a data capture group 500, a management service, such as described herein with reference to FIG. 3, receives a request to capture a snapshot of a data capture group 502, whereby the request identifies the data capture group. The request may be received from a user 302. The request may identify the data capture group by a data capture group name, storage volume IDs, host identity or functionality or load balancer identity or functionality. The management service then identifies the storage volumes to be captured 504 based on the request and proceeds to capture a snapshot of the storage volumes. To ensure that a unified snapshot is taken, the management service causes input and output operations to the storage volumes to be suspended to paused 506. The management service 324 may instruct one or more hosts of a particular volume to suspend input and output operations to the storage volume. After the input and output operations are paused, the management service initiates capturing the snapshot 508. The management service detects that snapshot capturing is complete 510 (for example, after waiting for a period of time) and notifies the user that snapshot capturing is complete 512.

After snapshot capturing is completed, the snapshot is sent to a storage service where a copy of the snapshot will be held for future retrieval. The management service may instruct the storage service to retain the captured snapshot for a duration of time. The management service may receive the captured snapshot from the storage volumes and send the captured snapshot to the storage service or, alternatively, the management service may instruct the storage volumes to send the captured snapshot to the storage service directly. The captured snapshot may be stored as one or more homogeneous bodies or as one or more data objects that individually or collectively represent the captured snapshot. The management service may indicate to the storage service the location or locations of where the one or more homogeneous bodies or one or more data objects are to be stored. As another example, the storage service may independently determine the storage locations. Alternatively, the snapshot of each storage volume of the data capture group may be individually or in an independent location.

As described herein, a snapshot may be captured while input and output operations are suspended (also referred to herein as a unified snapshot or a consistent snapshot). Alternatively, the snapshot may be captured regardless of whether input and output operations are performed to the storage volumes. When a consistent snapshot is taken, the management service may identify the one or more hosts that read and write data to the storage volumes and instruct the one or more hosts to cease input and output operations while the pertinent data is captured.

In an embodiment, the one or more hosts may each use a command queue in which instructions that are slated for execution by the one or more hosts are prioritized. Prioritizing the instructions in the command queue ensures that the commands are sequentially executed by a host. Due to the sequential execution of instructions, input and output operations may be suspended by placing an instruction for capturing a storage volume ahead of read and write instructions in the command queue. The placement of the instruction for capturing a storage volume may thus ensure that data capturing is initiated before any input or output operations. It is noted that in some embodiments, the command queue may be implemented as a scheduler.

Figure 6:
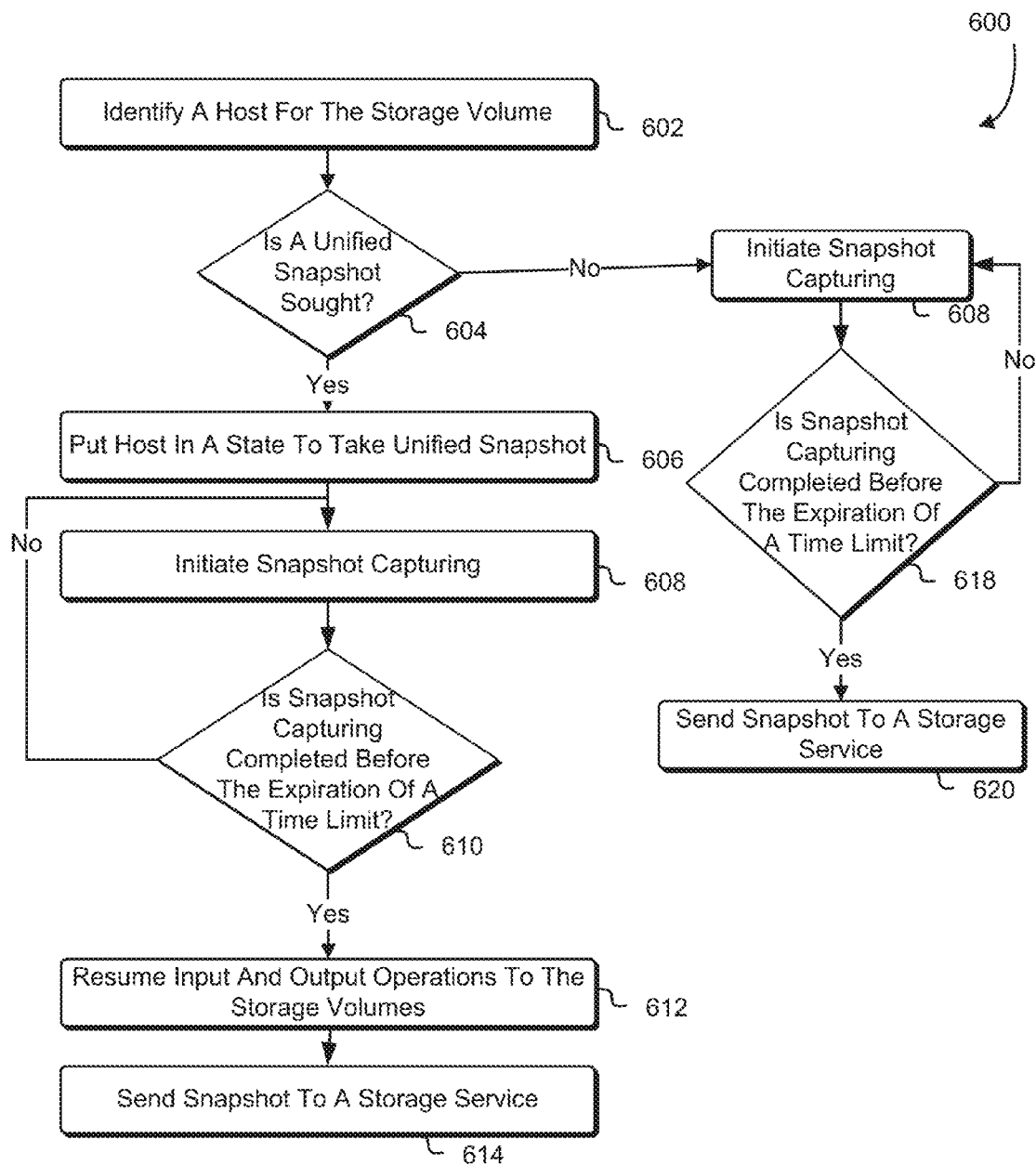
FIG. 6 shows a flow diagram of an example method for capturing a snapshot of a data capture group.

FIG. 6 shows a flow diagram of an example method for capturing a snapshot of a data capture group. In the example method for capturing a snapshot of a data capture group 600, management service 324 identifies the host for a storage volume 602 and determines whether a unified snapshot is sought 604. The management service 324 may determine whether a unified snapshot is sought based on the descriptive information or may resort to a default configuration if the descriptive information does not specify whether a unified snapshot is sought. For example, the management service 324 may be configured to command capturing a delta snapshot unless it is instructed otherwise.

If the management service 324 determines that a positive determination is sough, the host is put in a state to take a unified snapshot 606. As described herein, the host is put in a state to take a unified snapshot by suspending input and output operation to a storage volume. The management service 324 then initiated snapshot capturing 608 and determines whether snapshot capturing is completed before the expiration of a time limit 610. To determine whether snapshot capturing is completed before the expiration of a time limit, the management service 324 may start a timer and determine whether a captured snapshot is received prior to the expiration of the timer.

If snapshot capturing is completed before the expiration of the time limit, the management service 324 causes input and output operations to the storage volumes to be resumed 612 and the snapshot is sent to a storage service 614. If snapshot capturing is not completed before the expiration of the time limit, the management service performs a subsequent initiation of snapshot capturing 608.

If, however, the management service 324 determines that a unified snapshot is not sought, the management service 324 initiates snapshot capturing 616 without putting the host in a state to take a unified snapshot. The management service 324 then determines whether snapshot capturing is completed before the expiration of a time limit 618. If snapshot capturing is completed before the expiration of the time limit then the snapshot is sent to a storage service 620. If, however, snapshot capturing is not completed before the expiration of the time limit, the method 600 reverts to a subsequent initiation of snapshot capturing 616.

In addition to or instead of determining whether snapshot capturing is completed before the expiration of a time limit, the management service or, as may be contemplated in other embodiments, another entity of the block data storage service 316 may determine whether a captured snapshot is erroneous. If a captured snapshot is determined to be erroneous, snapshot capturing may be reinitiated as described with reference to FIG. 6. A snapshot may be deemed erroneous if, for example, the snapshot fails an error detection scheme, such as a hash function or a redundancy check.

A user may add or remove storage volumes to a host dynamically as the needs of the user change. For example, in intervals of heavy web traffic storage volumes may be added to a host functioning as a web server. The addition or removal of storage volumes used by a host may necessitate modifying a data capture group accordingly. In addition to modifying the storage volumes of the data capture group, the user may request the management service to modify the retention period of a snapshot, the destination storage service of the snapshot and the like. To modify an existing data capture group, the user sends a request for modifying the data capture group to the management service 324 as described with reference to FIG. 7.

Figure 7:
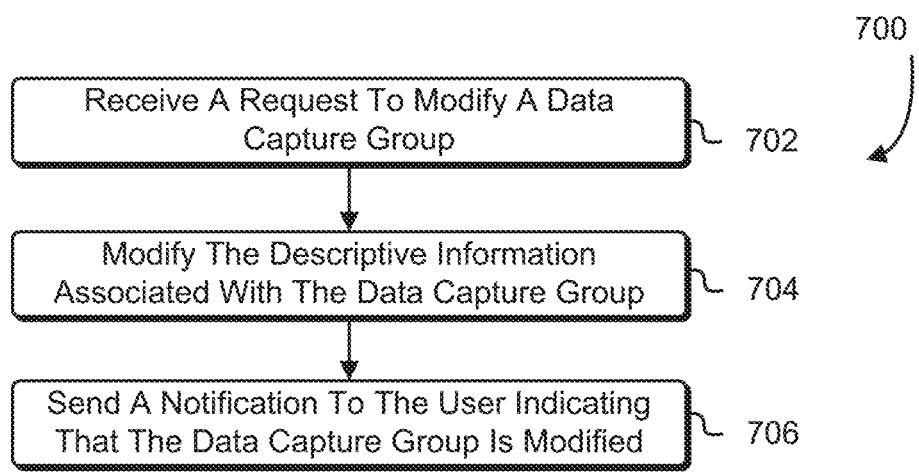
FIG. 7 shows a flow diagram of an example method for modifying a data capture group.

FIG. 7 shows a flow diagram of an example method for modifying a data capture group. In the method 700, the management service receives a request to modify the data capture group from the user 302 702. The request to modify the data capture group may be performed as an API function call by the user. The request includes an identity of the data capture group and the descriptive information that is requested to be modified. The request to modify the data capture group may include a request for the addition of storage volumes to the data capture group, the removal of volumes from the data capture group, a change to the retention period of a snapshot or the destination storage service of the snapshot or a preferred restoration location for restoring the snapshot storage volumes, among others. As with defining the data capture group, the user may identify storage volumes for modifying the data capture group using a volume identity, the name or functionality of a host of the storage volumes, the name or functionality of a load balancer that services a host of the storage volumes.

The management service 324 modifies the descriptive information associated with the data capture group in the metadata storage 326 in accordance with the request 704. If needed, the management service may also identify the storage volumes that are requested to be modified. The management service then sends a notification to the user indicating that the data capture group has been modified 706.

After the modification of the data capture group subsequent requests to capture a snapshot will be based on the modified data capture group. To revert to a previously defined data capture group, the user may request further modification to the data capture group.

After a snapshot is stored, the user may seek to restore the snapshot. For instance, the snapshot may serve as a backup copy of the user's data and the user may seek to restore the snapshot due to data failure or the snapshot may have been taken for a regulatory purpose and the user may seek to restore the snapshot for user access. The user may send a request to the management service to restore the snapshot, whereby the user may specify the location to which the data is to be restored in the request or the location may be specified in the descriptive information associated with the data capture group. The snapshot of the storage volumes of the data capture data may be restored as one or more homogeneous bodies or one or more data objects that individually or collectively represent the captured snapshot. Alternatively, the snapshot of each storage volume of the data capture group may be restored to an individual or independent restoration location. The location(s) to which the snapshot is restored may be specified as part of the descriptive information or in the request to restore the data capture group.

Figure 8:
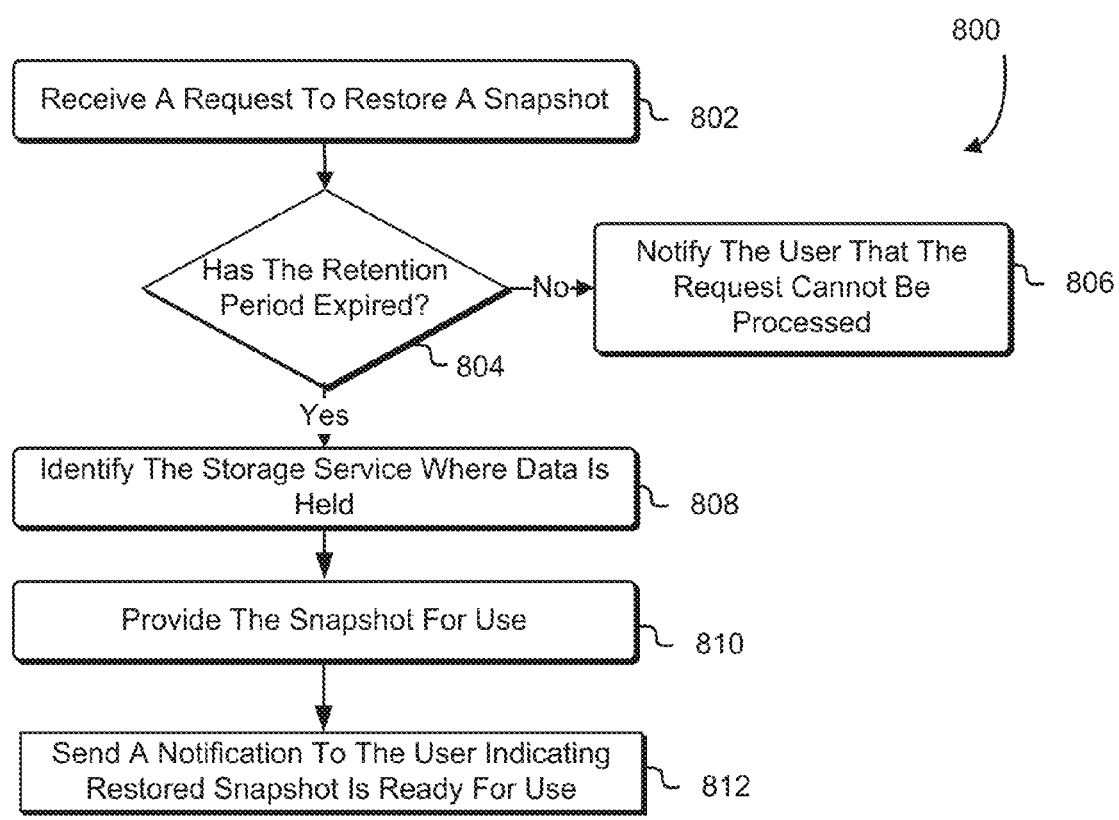
FIG. 8 shows a flow diagram of an example method for restoring a snapshot.

FIG. 8 shows a flow diagram of an example method for restoring a snapshot. The management service receives a request to restore a snapshot 802. The request to restore the snapshot may include a name or identity associated with the data capture group or a name or identity associated with the captured snapshot that is sought to be restored. It is noted that the name or identity of a captured snapshot may be provided by the management service to the user upon the snapshot being captured. The name or identity of a captured snapshot may be used to distinguish different snapshots. For example the captured snapshot identity may be used to distinguish two snapshots of the same data capture group that were captured at different points in time.

The management service determines whether the retention period associated with the snapshot has expired 804. If it is determined that the retention period has expired, the management service 324 notifies the user that the request cannot be processed 806. The notification may include a code indicating that the request cannot be processed due to the expiration of the retention period.

If, on the other hand, it is determined that the retention period has not expired, then the management service identifies the storage service where data is held 808 and the data is provided for use 810, for example, by restoring the data from the storage service to a storage location specified by the user. Then a notification is sent to the user indicating that the data is ready for use 812. It is noted that the location to which the data is restored may be identified by the user in the request to restore the snapshot or may be a part of the descriptive information of the data capture group.

The user may request the management service to delete a captured snapshot. Using a portal of the computing resource service provider executed on a computer, a human operator may, for example, request deleting captured snapshot by identifying the snapshot and causing a command to be sent to the management service. The management service may identify the storage service storing the snapshot and may, in turn, cause a second command to be executed requesting the management service to delete the snapshot. The management service may identify the snapshot to be deleted. Further, before sending the command, the management service may verify the lack of any delta snapshots that are captured as dependent on the snapshot sought to be deleted. After the verification is completed, the management service may request deletion of the captured snapshot. If a delta snapshot if found to depend upon the snapshot sought to be deleted, the management service may notify the user or request user confirmation of the request for deletion. Upon receipt of the confirmation, the management service may delete the snapshot.

In an embodiment, the user may request the management service to provide the user with status information associated with the data capture group. Using a portal of the computing resource service provider executed on a computer, a human operator may, for example, request receiving status information associated with the data capture group by identifying the data capture group and causing a command, such as an API call, to be sent to the management service. The user may receive the descriptive information associated with the data capture group as status information. Further, the user may also receive a log detailing the captured snapshot of the data capture group. The portal may cause the status information to be displayed on the computer as a result of the request to provide the user with the status information.

Figure 9:
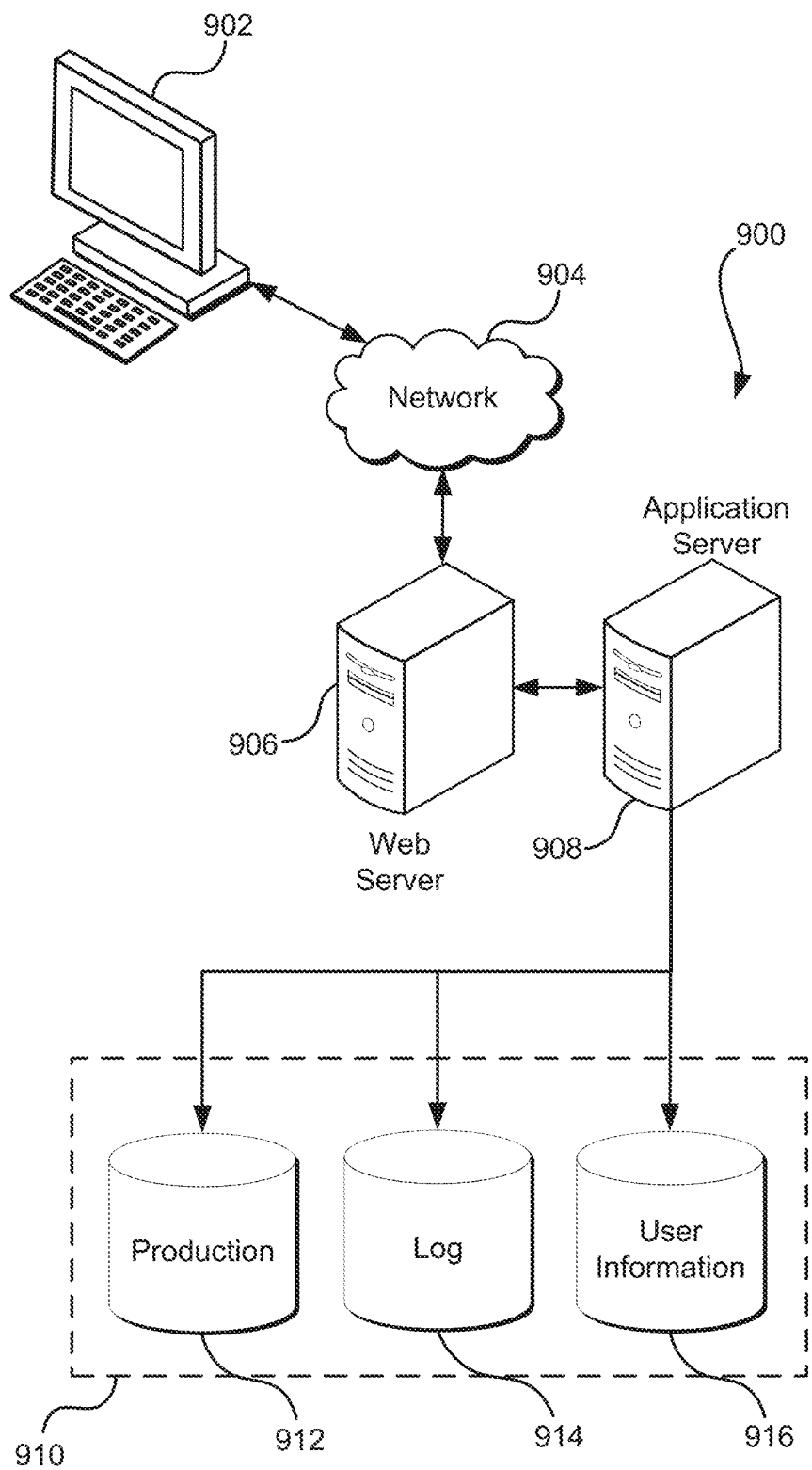
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 902 and the application server 908, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 910 can include several separate data tables, databases or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for capturing snapshots, the method comprising:
   under the control of one or more computer systems configured with executable instructions,
   receiving descriptive information defining a snapshot data capture group without explicitly identifying at least one storage volume associated with the snapshot data capture group, wherein the snapshot data capture group includes a plurality of storage volumes;
   creating, in a metadata storage, an entry based at least in part on the descriptive information;
   receiving a request to capture a snapshot of the snapshot data capture group; and
   in response to the request, for each storage volume from the plurality of storage volumes:
      causing input/output operations to the storage volume to pause;
      at a time when input/output operations to the storage volume are paused, causing a snapshot capture command to be issued for the storage volume; and
      at a time after the snapshot capture command is issued, causing the input/output operations to the storage volume to resume.

2. The method of claim 1 wherein the descriptive information identifies the plurality of storage volumes.

3. The method of claim 1, further comprising:
   determining an identity associated with the plurality of storage volumes based at least in part on an identity or function of one or more hosts using the plurality of storage volumes; and
   wherein the identity or function of the one or more hosts using the plurality of storage volumes is received in the descriptive information.

4. The method of claim 1, further comprising, for each storage volume form the plurality of storage volumes, causing the snapshot to be sent to a storage service.

5. The method of claim 4, further comprising:
   receiving a request to restore the snapshot;
   in response to the request to restore the snapshot, for each storage volume from the plurality of storage volumes:
      causing the snapshot to be obtained from the storage service; and
      causing the snapshot to be provided to a second storage service.

6. The method of claim 5, wherein causing the snapshot to be obtained from the storage service includes obtaining an individual snapshot of each storage volume from the plurality of storage volumes.

7. A computer-implemented method for capturing snapshots, the method comprising:
   under the control of one or more computer systems configured with executable instructions,
   receiving a request to create a data capture group, the data capture group including a plurality of storage volumes, the request including information defining the data capture group without explicitly identifying at least one storage volume associated with the data capture group;
   creating an entry, in a metadata storage, for the data capture group;
   receiving a request to capture a snapshot of the data capture group;
   in response to the request, for each storage volume in the data capture group, causing input/output operations to the storage volume to pause; and
   causing a command to capture a snapshot of at least one storage volume of the plurality of storage volumes to be issued.

8. The method of claim 7, wherein the request specifies one or more characteristics that define the data capture group by being common to each storage volume in the data capture group.

9. The method of claim 7, wherein the request to create the data capture group includes descriptive information associated with the data capture group, wherein the descriptive information indicates an identity associated with at least one storage volume of the plurality of storage volumes.

10. The method of claim 7, further comprising:
   detecting, independent of a customer request, a change to the data capture group;
   at a time after detecting the change to the data capture group, receiving a second request to capture a snapshot of the data capture group; and
   in response to the second request, for each storage volume in the changed data capture group, causing the command to capture a snapshot of at least one storage volume of the plurality of storage volumes to be issued.

11. The method of claim 10, wherein:
   the method further comprises:
      receiving a request to delete the data capture group; and
      updating metadata to indicate deletion of the data capture group; and
   one or more individual snapshots of each storage volume in the data capture group before the request to delete are persistently stored after updating the metadata.

12. The method of claim 7, further comprising:
   detecting that the captured snapshot is erroneous; and
   in response to detecting that the captured snapshot is erroneous, causing the command to reinitiate capturing the snapshot to be issued for each storage volume in the data capture group.

13. A computing resource service provider for capturing a snapshot of one or more storage volumes, the computing resource service provider comprising:
   a block data storage service comprising:
      one or more storage volumes; and
      metadata storage; and
   a management service configured to:
      receive a request to create a data capture group from a user, the data capture group including the one or more storage volumes from the block data storage service, the request including information defining the data capture group without explicitly identifying at least one storage volume associated with the data capture group;
      create an entry for the data capture group in the metadata storage;

cause input/output operations to the one or more storage volumes to pause in response to a request to capture a snapshot;
initiate capturing a snapshot of the data capture group; and
storing the snapshot in a storage service.

14. The computing resource service provider of claim 13, wherein the snapshot is a type of snapshot from a plurality of snapshot types, including a unified snapshot type, the management service is capable of causing to be taken.

15. The computing resource service provider of claim 13 wherein the storage service is an archival storage service, an on-demand storage service or a customer on-premise storage service.

16. The computing resource service provider of claim 13 wherein the management service is further configured to:
   determine whether the snapshot is captured before expiration of a time limit; and
   in response to the snapshot not being captured before the expiration of a time limit, reinitiate capturing the snapshot for each volume in the data capture group.

17. The computing resource service provider of claim 13 wherein:
   the request to create the data capture group specifics a storage volume characteristic; and
   the management service is further configured to determine the one or more storage volumes as a result of the one or more storage volumes sharing the storage volume characteristic.

18. The computing resource service provider of claim 13 wherein:
   initiating capturing a snapshot of the data capture group includes initiating an individual snapshot for each storage volume in the data capture group; and
   the management service is further configured to, for each storage volume in the data capture group, pause input/output operations prior to initiating an individual snapshot for the storage volume.

19. One or more non-transitory compute-readable storage media having collectively stored thereon instructions that, when executed by one or more processors of a system, cause the system to:
   receive a request to create a data capture group, the data capture group including a plurality of storage volumes, the request to create a data capture group including descriptive information associated with the data capture group without explicitly identifying at least one storage volume associated with the data capture group;
   create an entry, in a metadata storage, for the data capture group;
   receive a request to capture a snapshot of the data capture group;
   in response to the request, cause input/output operations of each storage volume of the plurality of the storage volumes to pause; and
   cause a command to capture a snapshot of each storage volume of the plurality of storage volumes to be issued.

20. The one or more non-transitory computer-readable storage media of claim 19, wherein the descriptive information includes a retention period associated with the snapshot.

21. The one or more non-transitory computer-readable storage media of claim 19, wherein the descriptive information includes an identity of a storage service for storing the snapshot.

22. The one or more non-transitory computer-readable storage media of claim 19, wherein the instructions further cause the system to:
   receive a request to modify the data capture group;
   update the metadata storage in accordance with the received request to modify the data capture group; and
   fulfill at least one additional request in accordance with the modified data capture group.

23. The one or more non-transitory computer-readable storage media of claim 19, wherein the request to create the data capture group specifies a characteristic defining the data capture group.

24. The one or more non-transitory computer-readable storage media of claim 19, wherein the descriptive information explicitly identifies the plurality of storage volumes.

* * * * *